Patented Aug. 2, 1949

2,478,045

UNITED STATES PATENT OFFICE 2,478,045

STABILIZATION OF BUTADIENE WITH SALICYLATES

Lewis F. Hatch, Austin, Tex., and David E. Adelson and Billee O. Blackburn, Berkeley, Calif., assignors to Shell Development Company, San Francisco, Calif., a corporation of Delaware No Drawing. Application December 2, 1946, Serial No. 713,466

8 Claims. (Cl. 260—666.5)

This invention relates to the art of stabilizing butadiene, and to the improved composition thereby obtained. Also, the invention is directed to the use of stabilized butadiene in emulsion copolymerization reactions, that is, it deals with butadiene compositions which, although containing sufficient stabilizer to inhibit the premature polymerization of the butadiene during shipment or storage, can be successfully employed in copolymerizations without having to remove the inhibitor before polymerization. The stabilized butadiene of the invention has the unexpected advantage that copolymers thereof have especially desirable properties due to the presence of the butadiene stabilizer therein.

When butadiene is exposed to the action of air and/or light, a gradual polymerization takes place with the formation of resinous products. Also, it has been found that the storage of butadiene in ferruginous containers, such as iron drums, promotes corrosion of the containers, the rust thus formed, in turn, promoting the polymerization of the butadiene. Although plastic materials, such as synthetic rubber, are produced by the polymerization of butadiene, it is frequently desirable, if not essential, that the butadiene be stabilized against such polymerization so that it can be stored for relatively long periods of time following its preparation. This is due to the fact that butadiene finds many uses, such as in the manufacture of chloroprene or of products of emulsion polymerization of the butadiene with other copolymerizable compounds of the type of styrene, and vinyl type cyanides, such as acrylic or methacrylic acid nitriles, in which it is desirable to maintain the butadiene in the monomeric state at least until its utilization.

It is therefore among the objects of the invention to provide a process for inhibiting polymerization of butadiene. A further object of the invention is to provide a relatively stable monomeric butadiene. Another object of the invention is to inhibit corrosion or rusting of ferruginous containers in which butadiene is stored.

As stated above, butadiene-1,3 is frequently used as one of the reactants for the preparation of resinous or plastic materials by the polymerization thereof with other copolymerizable compounds. Heretofore, when various readily polymerizable materials, such as vinylidene chloride and the like, stabilized against undesirable polymerization by the addition of different stablizing agents, were to be used as one of the reactants in copolymerization processes, it was necessary to subject such stabilized compounds to a preliminary treatment, such as a distillation or a treatment with caustic, to remove the stabilizing agent prior to the use of the material in the aforementioned copolymerization reaction. Such additional treatment of the polymerizable monomeric compounds naturally increased the cost of the final products obtained. It is, therefore, a still further object of the invention to provide stabilization agents which, although inhibiting the undesirable polymerization of butadiene-1,3 under normal storage or transportation conditions, will not affect substantially the copolymerization thereof with other readily polymerizable compounds, thereby obviating the necessity of pretreating the stabilized butadiene to remove the stabilizing agents therefrom prior to such copolymerization reactions. One of the most specific objects of the invention is the provision of stabilizing agents which will inhibit the undesirable polymerization of the butadiene under storing and/or transporting conditions, but which will have substantially no effect on the catalytic emulsion polymerization of such stabilized butadiene with styrene, acrylic and/or methacrylic acid nitriles. A further object is to produce stabilized butadiene which gives copolymers containing the stabilizing agent, which copolymers have superior properties, particularly with respect to light resistance, compared with the corresponding copolymers which do not contain such stabilizing agent.

It has now been discovered that the above and other objects may be attained by incorporating certain organic compounds. More specifically, it has been discovered that certain esters of salicylic acid, when added to the butadiene, will stabilize it against polymerization, and will prevent corrosion or rusting of ferruginous containers employed for storage and/or transportation of the butadiene thus stabilized. It has also been found, however, that these esters, when used in the proper amount, do not affect the copolymerization, and especially the so-called catalytic emulsion polymerization of the thus stabilized butadiene with compounds of the type of the acrylic or methacrylic acid nitriles. Therefore, butadiene stabilized with properly controlled amounts of the compounds constituting one phase of the present invention may be employed in such polymerization reactions without its being necessary or even desirable to subject the stabilized butadiene to any pretreatment which would separate the butadiene from the stabilizing agent employed.

Generically stated, the organic compounds which are suitable as stabilizing agents for the butadiene consist of the salicylic acid esters which are soluble in butadiene-1,3, most preferably the alkyl and aryl salicylates, and more particularly comprise the salicylates which have a phenyl radical or an aliphatic chain of not more than four or five carbon atoms attached to the carboxyl radical of the salicylate. Of these compounds, the lower homologues of each series were found to be of particular advantage as agents which, although preventing rust formation and the undesirable polymerization of butadiene subjected to storage and/or transportation, nevertheless, when used in the proper amount, do not inhibit or, in fact, in any way affect the emulsion copolymerization of the thus stabilized butadiene with other polymerizable compounds such as the mentioned acrylic and methacrylic acid nitriles. In other words, although it is possible to use successfully salicylates of the type of ethyl salicylate, propyl salicylate, n-butyl salicylate, tertiary butyl salicylate, amyl salicylate, hexyl salicylate, cyclohexyl salicylate and naphthyl salicylate, the most highly satisfactory results have been obtained by the incorporation into the butadiene of methyl and/or phenyl salicylates.

The proportion in which the above stabilizing agents are incorporated with the butadiene is dependent, in part, upon the length of time for which it is desired to stabilize the butadiene, the composition and condition of the container employed for its storage and/or transportation, and the particular agent employed. Up to 2% by weight of salicylate stabilizer based on the butadiene may be used without interfering with copolymerization of the stabilized butadiene. Amounts of stabilizer up to about 1% are economically advantageous in providing adequate protection for the butadiene during storage and a marked improvement in the properties of copolymers produced from the thus stabilized butadiene. As a matter of fact, considerably smaller concentrations, e. g. in the order of 0.1% to 0.2%, or even less, such as 0.01%, of the salicylates have effectively stabilized butadiene. As previously pointed out, the presence of the stabilizing agents of the invention in the copolymers produced from the stabilized butadiene gives such copolymers especially advantageous properties. To this end it is often desirable to employ somewhat larger amounts of the selected salicylate or salicylates, for example, about 0.1% to 1% or more, not exceeding 2% by weight of the butadiene stabilized. In this way copolymers can be produced which are highly light stable, particularly with respect to ultra-violet light which is frequently the cause of hardening, checking and loss of elasticity in rubbers and plastics produced by copolymerization of butadiene with other polymerizable compounds. Furthermore, the copolymers produced from butadiene stabilized with salicylates, according to the invention, are especially advantageous in the manufacture of elastic protective films since not only is the copolymer itself protected from ultra-violet light but also the material covered by the film is so protected due to the salicylate therein. This is of particular importance in the protection of food and like materials subject to deterioration by the action of ultra-violet light.

The following detailed examples are given for the purpose of illustrating the present invention and the advantages derived from stabilizing butadiene-1,3 with the above-defined salicylates.

It is to be understood that the salicylates mentioned in these examples are given only by way of illustration and that other salicylates of the group defined above may be employed with the same or like success. Also, the invention is not to be considered as limited to the specific conditions, such as the concentrations of the stabilizing agent, disclosed in the examples.

Example I

Phenyl salicylate was added to liquefied butadiene-1,3 in such an amount that its concentration in the stabilized product was equal to about 0.1% by weight. This liquid product was then introduced into an evacuated steel bomb. After thus filling the bomb, the inlet valve was closed, and the filled bomb was stored for a period of about 13½ months. At the end of this period of time, the butadiene was withdrawn from the container. This butadiene was found to be colorless and substantially free from any non-volatile materials, i. e. products of butadiene polymerization. Upon sawing off the ends of the storage bomb, and upon examining the inner walls of the container, it was found that they were very clean and free from rust.

For purposes of comparison, butadiene which was not stabilized by the addition of any agent or agents, was introduced into a similar steel bomb, and was stored for the same period of time as the one containing the stabilized butadiene. Upon withdrawal of the butadiene at the end of the 13½-month period, it was found that the butadiene contained a rusty sediment. Also, the inner walls of the bomb were highly corroded. Since the greatly increased surface presented by the rust affords an opportunity for the formation of polymerization centers, the presence of such rust in containers for butadiene storage is highly undesirable.

A comparison of the above tests shows that the presence of even small amounts of the mentioned salicylate in the butadiene prevents the corrosion of the walls of ferruginous containers employed for its storage. This, in turn, retards or even prevents any undesirable polymerization of the stored butadiene.

Example II

For the purpose of determining the effect of the presence of alkyl or aryl salicylates on the copolymerization of butadiene with acrylonitrile, a series of emulsion copolymerizations were effected both in the presence and in the absence of these butadiene stabilizing agents. Each charge had the following composition:

| | Per cent |
|---|---|
| Butadiene | 21.5 |
| Acrylonitrile | 7.1 |
| Water | 69.9 |
| Soap flakes | 1.4 |
| Ammonium persulfate | 0.11 |

The soap was employed as the dispersing agent, while the ammonium persulfate acted as the reaction-promoting catalyst. The molar ratio of the butadiene to the acrylonitrile was three to one. In the runs wherein the salicylate was used the concentration of this butadiene stabilizer was equal to about 0.1% by weight of the butadiene employed.

Each polymerization reaction was continued for a period of about 56 hours, the reactants being maintained for this period of time in a Pyrex glass bomb at a temperature of about 40°

C. At the end of the run, each sample was transferred into a glass beaker. A sodium chloride solution was then added, and the material thus precipitated was filtered and washed. The following table shows the yield of copolymers obtained:

| Run | Stabilizer | Yield of Copolymer |
|---|---|---|
|  |  | Per cent by weight |
| 1 | None | 93.0 |
| 2 | do | 94.3 |
| 3 | Phenyl salicylate | 91.5 |
| 4 | Methyl salicylate | 90.3 |

In the above experiments the butadiene containing the stabilizing agent was transferred in a liquid phase from the storage tank to the reaction bomb. An analysis of the results shows that the presence of the described stabilizing agents does not interfere with the copolymerization of the thus stabilized butadiene with other copolymerizable compounds, such as acrylonitrile, the yields of copolymer being substantially the same whether the stabilizer is present or absent in the reaction mixture. These results may be compared with the following figures obtained in comparable tests of other types of additives:

| Additive | Concentration of Additive in the Butadiene | Yield of Copolymer |
|---|---|---|
|  | Percent | Weight Percent |
| p-phenyl phenol | 0.1 | 74.0 |
| p-amino phenol | 0.1 | none |
| phenyl beta-naphthylamine | 0.1 | none |
| hydroquinone | 0.1 | 55.2 |
| catechol | 0.1 | none |
| beta-naphthol | 0.1 | 81.7 |
| 4-tert. butyl catechol | 0.03 | 84.6 |
| phenyl beta-naphthylamine | 0.01 | 81.1 |
| Do | 0.03 | 70.6 |
| methyl 3-hydroxy-2-naphthoate | 0.1 | 54.7 |
| methyl p-hydroxy benzoate | 0.1 | 59.4 |

Although the present invention has been described with particular reference to the stabilization of butadiene with phenyl salicylate, and the emulsion copolymerization of acrylonitrile with butadiene stabilized with methyl or phenyl salicylate, it is to be understood that other salicylates of the described group may also be used, and that these stabilizers do not interfere with the copolymerization of the thus stabilized butadiene with other copolymerizable compounds, when used in substantial proportions, i. e. about 5% to 95% based upon the amount of stabilized butadiene-1,3 employed. As other copolymerizable compounds which may be used to prepare more advantageous copolymers according to the invention, in addition to those already mentioned, are included, for example, acrolein, methacrolein, methyl vinyl ketone, methyl isopropenyl ketone, methyl methacrylate, ethyl acrylate, methyl styrene, isoprene, 2-methylpentadiene-1,3, chloroprene, vinyl chloride, vinyl acetate, and the like, which may be used singly or in admixture. It will therefore be seen that the invention is not intended to be limited to the examples given by way of illustration nor by any theory proposed in explanation of the improved results which are obtained.

This application is a continuation-in-part of copending application Serial No. 414,864, filed October 13, 1941, now abandoned.

We claim as our invention:

1. Monomeric butadiene-1,3 stabilized with 0.1% by weight of phenyl salicylate.

2. Monomeric butadiene-1,3 stabilized with 0.1% by weight of methyl salicylate.

3. Stabilized monomeric butadiene-1,3 containing 0.01% to 0.1% by weight of a salicylate having an aliphatic chain of not more than six carbon atoms attached to the carboxyl radical of the salicylate.

4. Monomeric butadiene-1,3 containing 0.01% to 0.1% by weight of a compound having the general formula

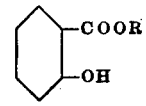

wherein R represents a hydrocarbon radical of not more than six carbon atoms.

5. Monomeric butadiene-1,3 containing between 0.01% and 2% by weight of an ester of salicylic acid and a monohydric alcohol which ester is soluble in said butadiene.

6. A process for preserving butadiene-1,3 disposed in ferruginous containers, which comprises dissolving 0.01% to 0.1% by weight of phenyl salicylate in the butadiene.

7. A process for preserving butadiene-1,3 disposed in ferruginous containers which comprises dissolving 0.01% to 0.1% by weight of methyl salicylate in the butadiene.

8. A process for preserving butadiene-1,3 disposed in ferruginous containers which comprises dissolving in the butadiene between 0.01% and 1% by weight of an ester of salicylic acid and a monohydric alcohol which ester is soluble in said butadiene.

LEWIS F. HATCH.
DAVID E. ADELSON.
BILLEE O. BLACKBURN.

REFERENCES CITED

The following references are of record in the file of this patent:

UNITED STATES PATENTS

| Number | Name | Date |
|---|---|---|
| 1,884,559 | Calcott et al. | Oct. 25, 1932 |
| 1,973,000 | Konrad et al. | Sept. 11, 1934 |
| 1,995,615 | Jaeger | Mar. 26, 1935 |
| 2,154,389 | Stoesser | Apr. 11, 1939 |
| 2,157,068 | Carrothers | May 2, 1939 |
| 2,260,475 | Murke | Oct. 28, 1941 |
| 2,402,113 | Hatch et al. | June 11, 1946 |

OTHER REFERENCES

Science of Petroleum, vol. 2, pages 1019–20; and vol. 3, 1708–12 (1938), Oxford University Press, N. Y. Copy in Division 31.